(12) United States Patent
John

(10) Patent No.: US 10,232,738 B2
(45) Date of Patent: Mar. 19, 2019

(54) FASTENING DEVICE FOR A CONDUCTOR RAIL AND CONTACT LINE SYSTEM

(71) Applicant: Rail Power Systems GmbH, München (DE)

(72) Inventor: Andreas John, Höhenkirchen-Siegertsbrunn (DE)

(73) Assignee: Rail Power Systems GmbH (DE)

( * ) Notice: Subject to any disclaimer, the term of this patent is extended or adjusted under 35 U.S.C. 154(b) by 111 days.

(21) Appl. No.: 15/114,439

(22) PCT Filed: Feb. 5, 2015

(86) PCT No.: PCT/EP2015/052428
§ 371 (c)(1),
(2) Date: Jul. 27, 2016

(87) PCT Pub. No.: WO2015/118074
PCT Pub. Date: Aug. 13, 2015

(65) Prior Publication Data
US 2016/0339800 A1    Nov. 24, 2016

(30) Foreign Application Priority Data
Feb. 5, 2014   (DE) .................. 10 2014 001 456

(51) Int. Cl.
*B60M 1/16* (2006.01)
*B60M 1/24* (2006.01)
*B60M 1/30* (2006.01)

(52) U.S. Cl.
CPC ............. *B60M 1/16* (2013.01); *B60M 1/24* (2013.01); *B60M 1/307* (2013.01)

(58) Field of Classification Search
CPC .......... B60M 1/16; B60M 1/24; B60M 1/307; B60M 1/20; B60M 1/18; B60M 1/30; B60M 1/23; H01B 17/32
(Continued)

(56) References Cited

U.S. PATENT DOCUMENTS 3,461,250 A   8/1969   Dehn
3,985,211 A   10/1976  Bommart
(Continued)

FOREIGN PATENT DOCUMENTS

CN   2683442 Y    3/2005
DE   19913351 C1  9/2000
(Continued)

OTHER PUBLICATIONS

International Search Report in corresponding International Application No. PCT/EP2015/052428 dated Jun. 5, 2015, 8 pp. (not prior art).
(Continued)

*Primary Examiner* — Mark T Le
(74) *Attorney, Agent, or Firm* — Lucian Wayne Beavers; Patterson Intellectual Property Law, PC

(57) ABSTRACT

A fastening device for a conductor rail and a contact line system having fastening devices to which the conductor rail is fastened. The fastening device is in the form of a plastic component. The plastic component has sliding jaws which enclose the conductor rail laterally and can be fixed in a position in which they enclose the fastening piece of the conductor rail from both sides. The fastening device can be produced inexpensively by methods known from plastic processing, for example injection molding methods. Further advantages arise from the fact that plastic material is an electrical insulator. In addition, the plastic material allows the conductor rail to be adjusted in a sliding manner in the fastening device before it is fastened.

10 Claims, 4 Drawing Sheets

Figure 1:
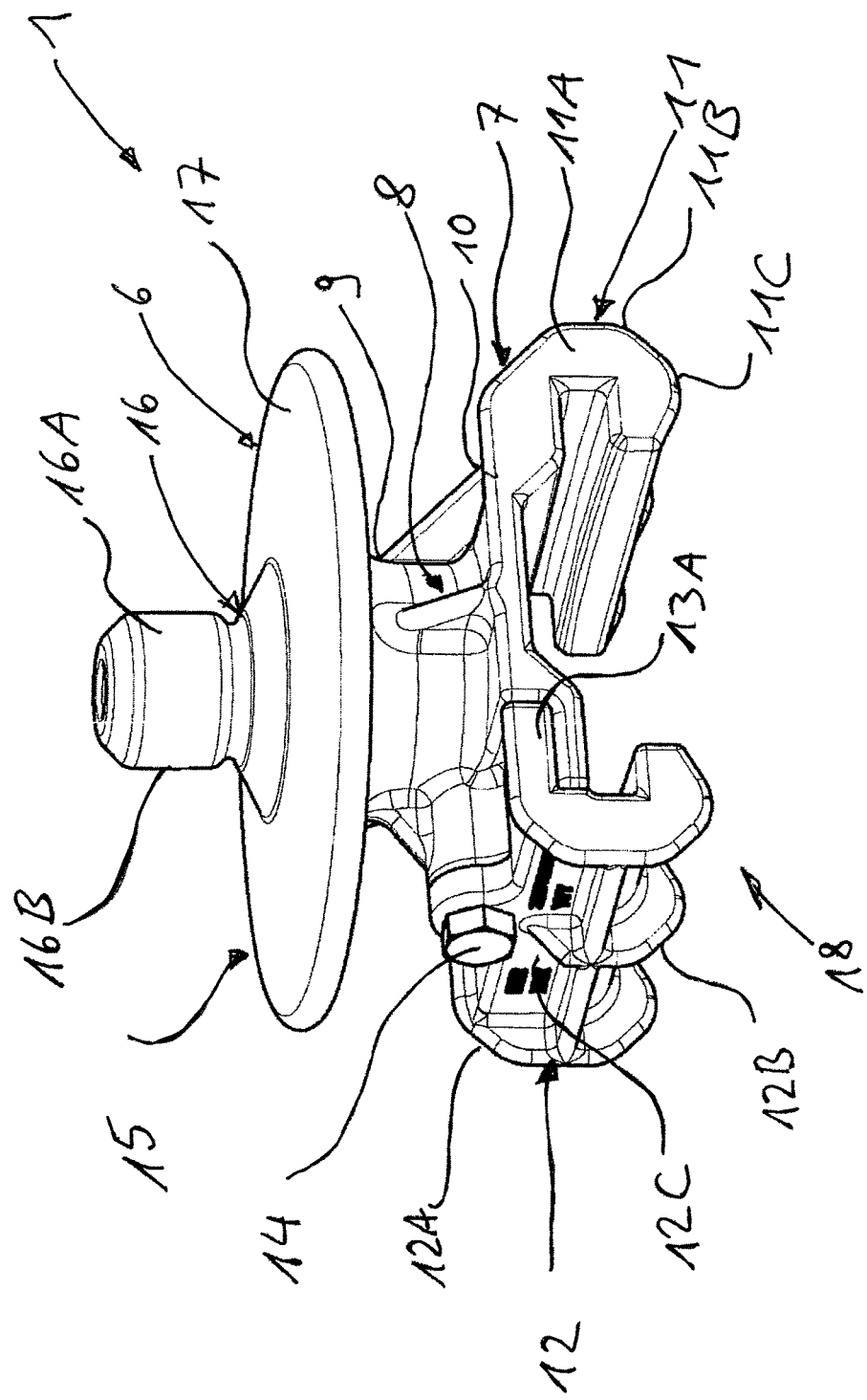

(58) Field of Classification Search
USPC ........ 238/322, 327 R, 327 A, 325, 358, 316;
248/226.12, 228.5, 228.3; 191/39
See application file for complete search history.

(56) References Cited

U.S. PATENT DOCUMENTS

| | | |
|---|---|---|
| 4,318,462 A | 3/1982 | Weinhaus |
| 5,037,052 A * | 8/1991 | Crisp .................. A01M 31/025 248/229.23 |
| 7,703,589 B2 | 4/2010 | Kalitzki |

FOREIGN PATENT DOCUMENTS

| | | |
|---|---|---|
| DE | 102010033451 A1 | 2/2012 |
| DE | 102012000117 B3 | 4/2013 |
| EP | 0593350 A1 | 4/1994 |
| EP | 2255991 A2 | 12/2010 |
| GB | 1144004 * | 3/1969 |
| WO | 2006100267 A1 | 9/2006 |
| WO | 2008142021 A1 | 11/2008 |
| WO | WO 2010/120130 * | 10/2010 |

OTHER PUBLICATIONS

International Preliminary Report on Patentability in International Application No. PCT/EP2015/052428 dated Aug. 9, 2016, 5 pp. (not prior art).
Office Action in corresponding China application dated Jun. 2, 2018 (not prior art).

* cited by examiner

FASTENING DEVICE FOR A CONDUCTOR RAIL AND CONTACT LINE SYSTEM

The invention relates to a fastening device for a conductor rail and to a contact line system having fastening devices to which the conductor rail is fastened.

For supplying power to electrically operated trains there are known, in addition to overhead lines, conductor rails which are part of the contact line system. EP 2 255 991 A2 describes a conductor rail having a gantry support from which there protrude two tensioning arms on which clamping arms for a receiving a contact wire are formed. The tensioning arms and clamping arms enclose a space which receives connection pieces for connecting the conductor rail segments.

DE 10 2012 000 117 B3 discloses a contact line system having conductor rail segments which have, in the installed position, an upper carrier provided with a recess extending in the longitudinal direction, and allow the conductor rail segments to be fastened to crossbeams of the contact line system by means of connecting elements engaging in the recess. The connecting elements are preferably hammer-head machine screws. The known conductor rails permit fastening to crossbeams of the contact line system not only by means of hammer-head machine screws but also by means of fastening devices which have a holder enclosing the upper carrier of the conductor rail. A preferred embodiment of this holder provides plastic spacer elements for fixing the conductor rail carrier.

DE 199 13 351 C1 describes a fastening device for a conductor rail having a fastening piece which is to be inserted into the fastening device. The fastening device has jaws which enclose the fastening piece of the conductor rail. The fastening piece is fixed in the jaws by clamping screws.

All the known fastening devices for conductor rails are characterised by the fact that they consist of a metal body. The fastening devices can be made of aluminium, for example. They permit simple mounting and dismantling of the conductor rails and have proved themselves in practice. However, the relatively high production costs are a disadvantage.

The problem addressed by the invention is to provide a fastening device for a conductor rail which can be produced in large numbers at comparatively low cost and permits simple mounting and dismantling of the conductor rail. It is a further object of the invention to provide a contact line system which can be constructed at comparatively low cost and permits simple mounting and dismantling of the conductor rail.

According to the invention, the objects are achieved by the features of the independent claims. The dependent claims relate to preferred embodiments of the invention.

The fastening device according to the invention is characterised in that, unlike the known fastening devices, it is not in the form of a metal component, but rather of a plastic component. A plastic component is also understood to mean a unit which consists of a plurality of plastic parts. A plastic component is also understood as being a component which also contains one or more metal components, for example metal components for connecting the plastic parts, in particular a metal screw. It is important only that the basic constituent of the fastening device can be produced by methods known from plastic processing, for example injection moulding methods.

Although all the known fastening devices are made of metal, it has been found that producing the fastening devices from plastic material has advantages. These advantages include not only the significantly lower manufacturing costs, but also the properties which result from plastic material as an electrical insulator. Moreover, the plastic material allows the conductor rail to be glidingly adjusted in the fastening device. Placing additional spacers or sliders there between is therefore not necessary, which in turn simplifies the production of the fastening device and the handling thereof.

The plastic component of the fastening device according to the invention has sliding jaws which enclose the conductor rail laterally and can be fixed in a position in which they enclose the fastening piece of the conductor rail from both sides. The sliding jaws can be of different forms. It is important only that the conductor rail is fixed by the sliding jaws in a sliding manner, that is to say changes in length of the conductor rail as a result of temperature changes are possible.

In a preferred embodiment of the fastening device, the plastic component has, in the installed position, an upper part and a lower part, wherein the upper part is in the form of an insulator and the lower part forms the holder for the fastening piece of the conductor rail. The part of the plastic component that is in the form of an insulator has one or more shields or ribs for lengthening the creepage distance. Consequently, the fastening device according to the invention functions not only as a conductor rail clamp of known construction but also as an insulator. Since the lower part of the fastening device according to the invention also has the electrical properties of an insulator, the overall height of the unit as a whole can be reduced.

The sliding jaws laterally enclosing the connecting piece of the conductor rail are formed such that the conductor rail is guided in a sliding manner in the fastening piece. The sliding jaws each preferably have, in the installed position, an upper and a lower leg which are connected together via a lateral leg.

In a further preferred embodiment of the fastening device, the lower part of the plastic component has a central base body, wherein one sliding jaw is integral with the base body and the other sliding jaw can be attached to the base body. To mount the conductor rail, the rail needs only to be inserted into the fixed sliding jaw and then fixed to the loose sliding jaw. The central base body is preferably so profiled on the side facing the attachable sliding jaw, and the attachable sliding jaw is preferably so profiled on the side facing the base body, that the sliding jaw and the base body interlock. An interlocking connection of the sliding jaw and the base body is thereby also achieved, permitting simple opening and closing of the holder and secure fixing.

The attachable sliding jaw preferably has profile pieces which engage a profile piece of the central base body from above and from beneath. It is, however, also possible for the base body to have profile pieces which engage a profile piece of the attachable sliding jaw from above and from beneath.

The attachable sliding jaw is fastened to the central base body preferably using a screw, by means of which the sliding jaw and the base body are screwed together.

A further preferred embodiment of the fastening device according to the invention provides that the upper part of the plastic component in the form of an insulator consists of a plurality of insulator components. It is thus possible to use the fastening device universally.

The fastening device allows the insulator to be lengthened easily depending on the use of the fastening device, for example for short- or long-distance travel, since the insulator can be composed of a plurality of insulator components which can preferably be screwed together. To that end, each insulator component has a core having, in the installed position, an upper and lower portion, wherein the upper portion has an external thread and the lower portion has a recess having an internal thread, such that the lower portion of one insulator component can be screwed to the upper portion of the other insulator component. However, it is also possible that the upper portion, in the installed position, of the insulator component has a larger external diameter than the lower portion and is provided with a recess which has an internal thread, while the lower portion has a smaller external diameter than the upper portion and is provided with an external thread.

When only low demands are to be placed on the electrical properties of the insulator, for example for use of the fastening device for short-distance travel, it is sufficient if the insulator has only a comparatively small length and has only a single shield.

The external or internal thread of the upper portion, in the installed position, can advantageously serve, as it were, as the fastening means for mounting the fastening device on a support point. It is therefore not necessary to provide further fastening means on the fastening device, thus obtaining a particularly simple construction.

Figure 2:
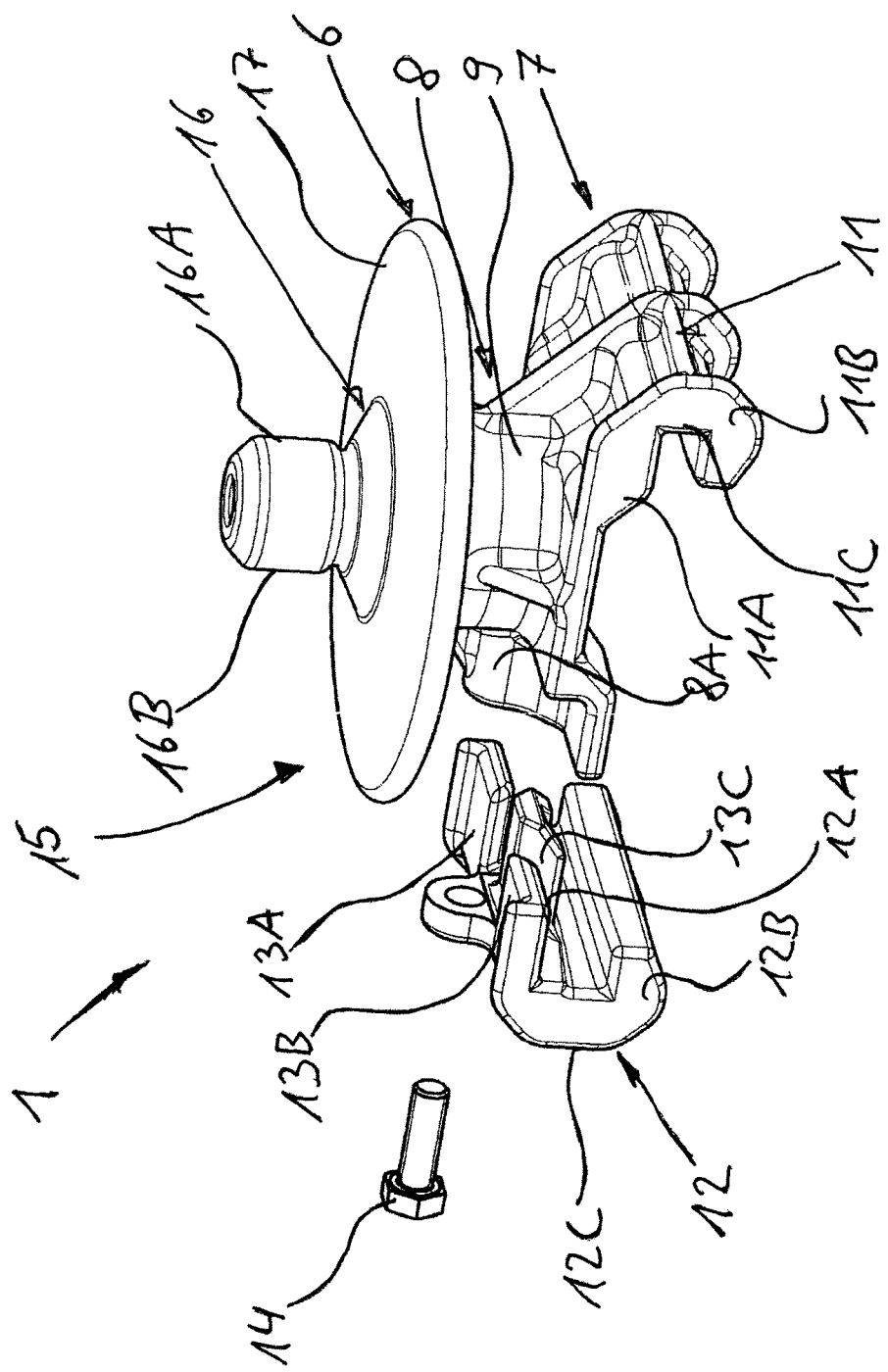
Figure 3:
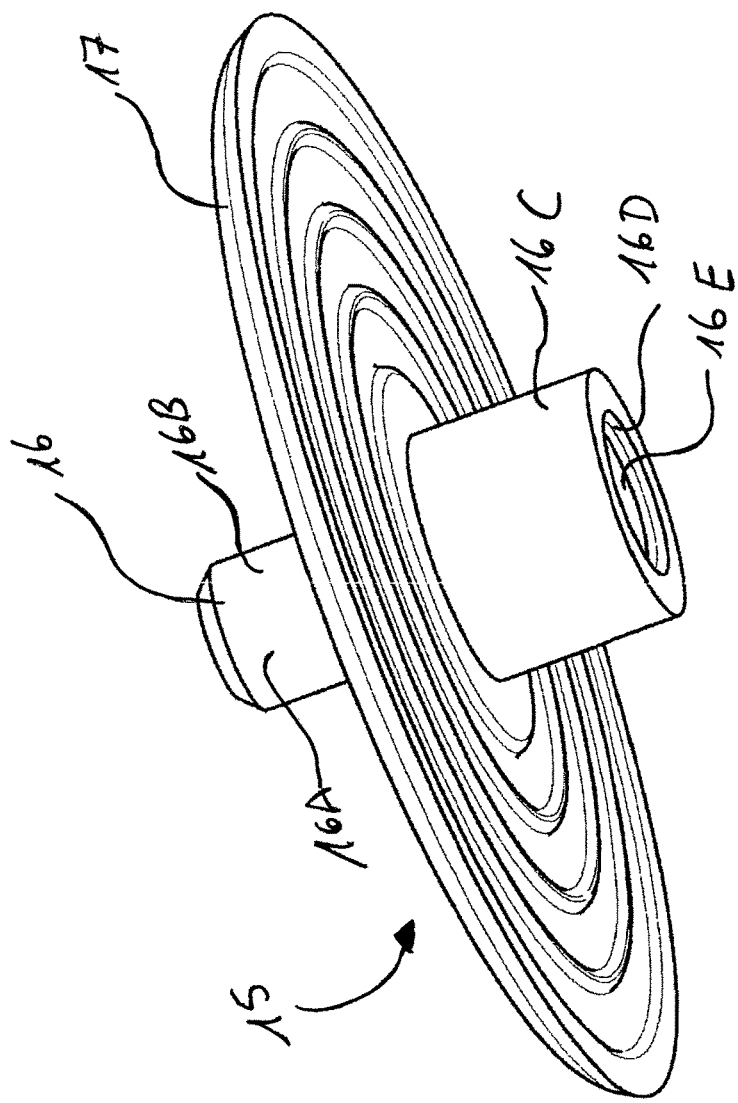
Figure 4:
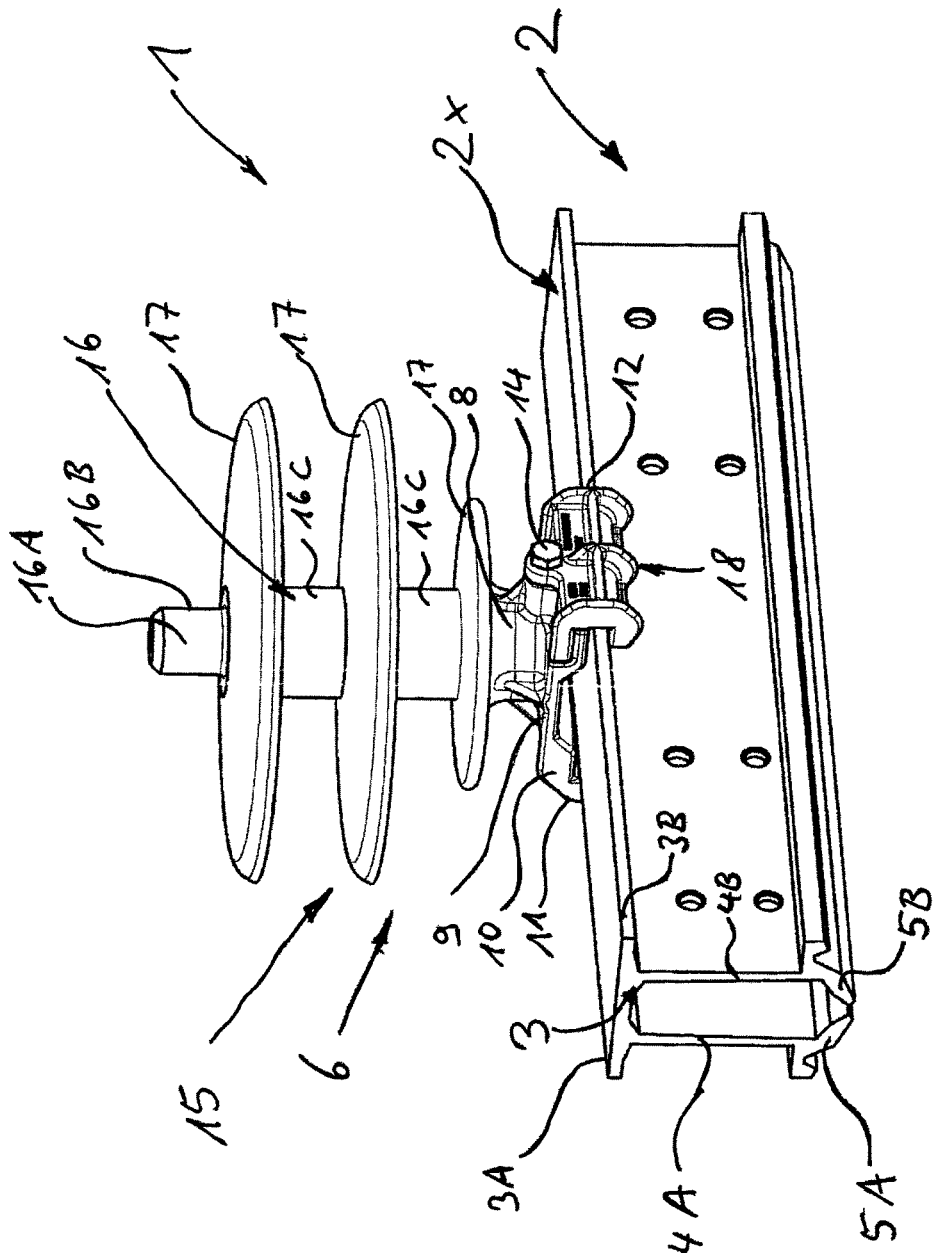

An embodiment of the invention will be described in detail below with reference to the figures, in which:

FIG. 1 is a perspective view of an embodiment of the fastening device according to the invention, the sliding jaws being screwed together, FIG. 2 shows the fastening device of FIG. 1 with a sliding jaw removed, FIG. 3 shows an insulator component for lengthening the insulator of the fastening device of FIG. 1, and FIG. 4 is a perspective view of a further embodiment of the fastening device together with a conductor rail.

The fastening device 1 according to the invention is described below in the installed position, in which the fastening device is suspended from a support point (not shown). The fastening device 1 can be fastened, for example, to a crossbeam, which in turn is fastened to the ceiling of a tunnel. Such fastening systems for an overhead conductor rail contact line system are known.

FIG. 1 shows an embodiment of the fastening device 1 according to the invention, which differs from the embodiment of the fastening device 1 shown in FIG. 4 only on account of the length of the insulator. Mutually corresponding parts are therefore provided with the same reference numerals. FIG. 4 shows the fastening device 1 together with the conductor rail 2.

The conductor rail 2 (FIG. 4) consists of a plurality of parts 2X, which are interconnected at the end faces by means of connecting elements (not shown). The conductor rail 2 has, in the installed position, an upper fastening piece 3 which has laterally protruding projections 3A, 3B and is fixed in a sliding manner in a holder 18 of the fastening device 1. The fastening piece 3 is adjoined on both sides by downwardly extending legs 4A, 4B, which merge at the bottom ends into inwardly extending clamping arms 5A, 5B, by which the contact wire (not shown) of the contact line system is calmingly held.

The fastening device 1 is a plastic component which, in the present embodiment, is made of glass fibre reinforced plastic material (GFRP). The plastic component has, in the installed position, an upper part 6 and a lower part 7, which are integrally interconnected. The upper part 6 is in the form of an insulator 15, while the lower part 7 forms the holder 18 for fixing the conductor rail 2 in a sliding manner.

The lower part 7 of the plastic component has a central base body 8 having an upper round portion 9 which merges into a lower plate-like portion 10, on the side of which a sliding jaw 11 is integrally formed. The sliding jaw 11 has an upper leg 11A and a lower leg 11B, which are interconnected via a lateral leg 110. The distance between the upper and lower legs 11A, 11B is such that the lateral projection 3A, 3B of the fastening piece 3 of the conductor rail 2 can be inserted into the sliding jaw 11 with an exact fit. The metal conductor rail is thus guided in a sliding manner in the plastic sliding jaw.

While one sliding jaw 11 is integral with the base body 8, the other sliding jaw 12 can be attached to the base body 8 for glidingly fixing the conductor rail 2, and fastened to the base body 8. FIG. 2 shows the fastening device 1 with the sliding jaw 12 removed. Like the sliding jaw 11 that is integral with the base body 8, the attachable sliding jaw 12 has an upper, a middle and a lower leg 12A, 12B, 12C which enclose the lateral projection 3A, 3B of the conductor rail.

The upper leg 12A of the attachable sliding jaw 12 has two lateral upper profile pieces 13A, 13B and a middle lower profile piece 13C, which is arranged at a spacing from the upper profile pieces 13A, 13B (FIG. 2). When the sliding jaw 12 is attached to the base body 8, the upper profile pieces 13A, 13B of the sliding jaw 12 engage a profile piece 8A of the base body 8 laterally from above, while the lower profile piece 13C of the sliding jaw 12 engages the profile piece 8A of the base body 8 in the middle from beneath. It is thus ensured that the sliding jaw 12 is seated firmly on the base body 8. The required clamping force is exerted by a screw 14, by which the sliding jaw 12 and the base body 8 are screwed firmly to one another. There is still a certain play between the sliding jaws 11, 12 and the end faces of the lateral projections 3A, 3B of the fastening piece 3 of the conductor rail 2, and so the conductor rail is mounted not in a clamped manner but in a sliding manner.

The fastening device shown in FIG. 1 is intended in particular for short-distance travel. The upper part 6 of the plastic component which forms the insulator 15 has an insulator core 16 and an insulator shield 17. The insulator core 16 of the one-piece insulator has an upper portion 16A which is provided with an external thread 16B. The upper portion 16A having the external thread 16B serves as the fastening means for mounting the fastening device 1 on a support point (not shown). For example, the upper portion 16A can be screwed to a fastening component (not shown) which has a recess having an internal thread.

For long-distance travel, higher demands are placed on the electrical properties of the insulator. In order to improve the electrical properties of the insulator, the length of the insulator can be increased.

FIG. 3 shows an insulator component 15 for lengthening the insulator of the fastening device of FIG. 1. The insulator component 15 has an insulator core 16 having an upper portion 16A and a lower portion 16C, and a shield 17. The lower portion 16C of the insulator core 16 has a recess 16D having an internal thread 16E, while the upper portion 16A has an external thread 16B. The external diameter of the upper portion 16A corresponds to the internal diameter of the recess 16D in the lower portion, the external diameter of the upper portion of the insulator core of the insulator component of FIG. 3 corresponding to the external diameter of the upper portion of the insulator core of the insulator of the fastening device of FIG. 1. In order to lengthen the insulator, the lower portion of one insulator component is screwed onto the upper portion of the other insulator component, it being possible for a plurality of insulator components to be screwed together.

FIG. 4 shows an embodiment in which a third insulator component 15 has been screwed onto the second insulator component 15. In this embodiment, the upper portion of the third insulator component forms the fastening means for mounting the fastening device on the support point (not shown). The shields 17 of the individual insulator components 15 can have different diameters.

The invention claimed is:

1. A fastener apparatus for attachment to a conductor rail, the conductor rail including a fastening piece having two opposed sides and two lateral edges, the fastener apparatus comprising:
   a holder formed from plastic material, the holder including first and second sliding jaws configured to be fixed together to enclose the fastening piece of the conductor rail laterally and from both sides so that the sliding jaws can slide relative to the fastening piece; and
   an insulator including first and second insulator components, the first insulator component being integrally formed from plastic with the first sliding jaw and including an integral first shield, the second insulator component being attached to the first insulator component and including an integral second shield;
   wherein the first insulator component includes an insulator core having an end portion opposite from the first sliding jaw, the end portion including a first thread integrally formed on the end portion;
   wherein the second insulator component includes a second insulator core including a second thread integrally formed on the second insulator core and configured to engage the first thread of the first insulator component;
   wherein one of the first and second threads is an external thread, and the other of the first and second threads is an internal thread defined in a recess of the respective insulator component; and
   wherein the second insulator component includes an end portion opposite from the second thread, the end portion of the second insulator component having an integrally formed third thread configured the same as the first thread.

2. The fastener apparatus of claim 1, wherein the plastic material comprises glass fiber reinforced plastic material.

3. The fastener apparatus of claim 1, wherein:
   the sliding jaws each include a first leg and a second leg interconnected via a lateral leg.

4. The fastener apparatus of claim 1, wherein:
   the holder includes a central base body, the first sliding jaw being integral with the base body and the second sliding jaw being attachable to the base body.

5. The fastener apparatus of claim 4, wherein:
   the base body includes a base body side facing the second sliding jaw;
   the second sliding jaw includes a second sliding jaw side facing the base body; and
   the base body side and the second sliding jaw side are profiled so as to provide an interlocking engagement of the base body and the second sliding jaw.

6. The fastener apparatus of claim 5, wherein:
   the base body includes a base body profile piece projecting from the base body side; and
   the second sliding jaw includes a plurality of jaw profile pieces projecting from the second sliding jaw side, the plurality of jaw profile pieces engaging the base body profile piece from opposite sides of the base body profile piece.

7. The fastener apparatus of claim 1, further comprising:
   a threaded connector connecting the second sliding jaw to the first sliding jaw.

8. The fastener apparatus of claim 1, in combination with a plurality of fastener apparatuses fastened to a conductor rail to form a contact line system.

9. The fastener apparatus of claim 1, wherein:
   the first and third threads are external threads and the second thread is an internal thread.

10. The fastener apparatus of claim 1, wherein:
    the first and third threads are internal threads and the second thread is an external thread.

* * * * *

UNITED STATES PATENT AND TRADEMARK OFFICE
CERTIFICATE OF CORRECTION

PATENT NO. : 10,232,738 B2
APPLICATION NO. : 15/114439
DATED : March 19, 2019
INVENTOR(S) : Andreas John It is certified that error appears in the above-identified patent and that said Letters Patent is hereby corrected as shown below:

In the Specification

Column 4, Line 4: replace "110" with --11C--.

Signed and Sealed this
Twenty-first Day of May, 2019

Andrei Iancu
*Director of the United States Patent and Trademark Office*